United States Patent Office 3,585,119
Patented June 15, 1971

3,585,119
METHOD FOR MAKING A BATTERY ELECTRODE
Victor J. Schneider, Norton, and Pranjivan V. Popat, Attleboro, Mass., assignors to Texas Instruments Incorporated, Dallas, Tex.
Filed July 20, 1967, Ser. No. 654,745
Int. Cl. B01k 5/02; C23b 13/00
U.S. Cl. 204—181                                   12 Claims

ABSTRACT OF THE DISCLOSURE

A battery electrode is made by immersing an electrically conductive electrode substrate and a counter electrode in a bath comprising a suspension of a metal oxide powder such as cadmium oxide powder in an aqueous alkaline electrolyte and by establishing an electrical field between the substrate and counter electrode for depositing the powder on the substrate and for converting the powder to an electrochemically active material such as cadmium metal to form a porous electrode structure.

---

In a conventional process for making a battery electrode, a porous electrode substrate is prepared by sintering a metal powder to an electrically conductive screen. The pores of the substrate are then impregnated with a selected metal salt solution and the substrate is immersed in an alkaline solution for converting the salt to a hydroxide and for precipitating the hydroxide within the substrate pores. After repeating these impregnation and conversion steps a number of times for precipitating a sufficient quantity or load of the hydroxide in the substrate pores, the loaded substrate is subjected to a formation step in which the hydroxide is cathodically converted to an electrochemically active material to form the desired porous electrode structure. This process is complex and expensive and requires considerable time to carry out the repeated impregnation and conversion steps. Further, the process is not well adapted to continuous production of battery electrodes and provides some difficulty in control of the thickness and charge capacity of the electrodes.

In addition, electrodes made by this process are somewhat limited with respect to charge density in terms of ampere-hours of storable energy per unit weight and volume of the electrode structure.

It is an object of this invention to provide a novel and improved process for making battery electrodes; to provide such a process which is easily and inexpensively performed; to provide such a process which produces battery electrodes in a much shorter time than the noted prior art process; to provide such a process which permits excellent control of electrode thickness and charge capacity; to provide such a process which produces electrodes characterized by improved energy density in terms of watt-hours per unit weight and volume of the electrode structure; and to provide such a process which is especially suited for continuous electrode production.

Briefly described, the novel and improved process of this invention includes the steps of immersing a porous, electrically conductive electrode substrate and a suitable counter electrode in a solution which embodies a suspension of a metal oxide powder in an electrolyte, preferably while the solution is agitated in any conventional manner. An electrical field is then established between the substrate and counter electrode for depositing the metal oxide on the substrate and for converting the oxide to an electrochemically active material to form the desired porous electrode structure.

In this novel and improved process, the electrically conductive substrate comprises either the porous sintered plaque of the prior art or an inexpensive woven wire or expanded metal screen. The process is easily, rapidly, and inexpensively performed and permits excellent control of the thickness and charge capacity of electrodes made by the process. The process also produces battery electrodes having improved energy density and, most importantly, the process is especially suited for continuous production of battery electrodes.

Other objects, advantages and details of the methods of this invention appear in the following detailed description of preferred embodiments of the invention, the detailed description referring to the drawings in which.

Figure 1:
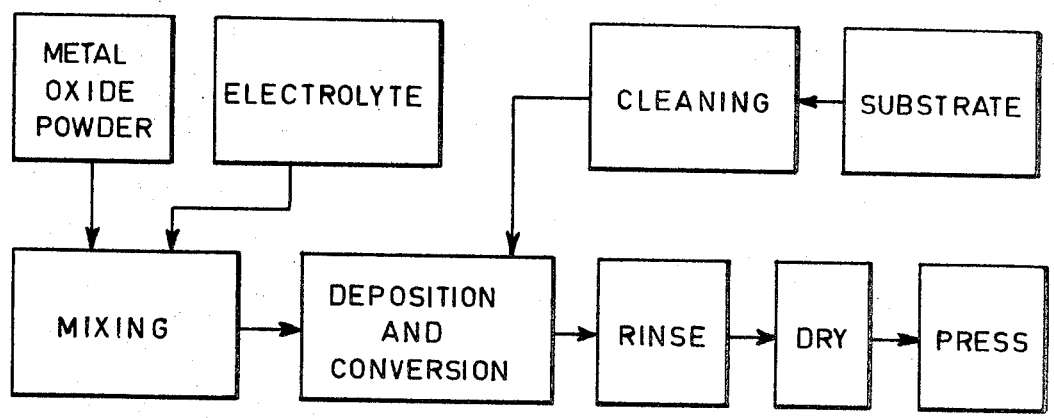
FIG. 1 is a block diagram illustrating process steps of the method of this invention.
Figure 2:
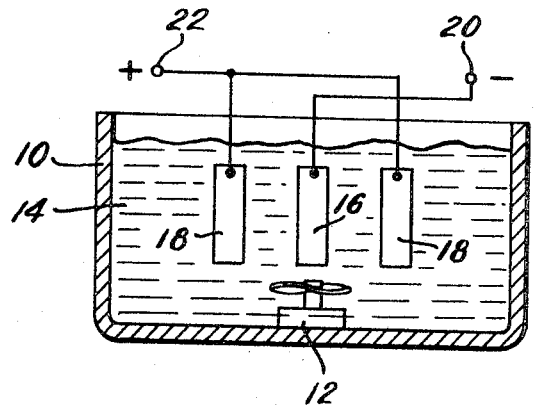
FIG. 2 is a diagrammatic view illustrating process steps of one embodiment of the method of this invention.

In accordance with the method of this invention, as illustrated in FIGS. 1 and 2, a selected metal oxide powder such as cadmium oxide powder is combined with an electrolyte such as an aqueous solution of potassium hydroxide in a suitable container 10 and is thoroughly mixed with the electrolyte by magnetic stirring or the like as indicated at 12 in FIG. 2, to form a suspension 14 of the metal oxide in the electrolyte. Preferably the cadmium oxide powder used is in finely-divided form embodying particles smaller than about 5 microns, and preferably smaller than about 2 microns, for facilitating suspension of the oxide in the electrolyte in which the oxide is essentially insoluble.

A porous, electrically-conductive electrode substrate 16 such as a length of expanded-metal nickel screen is then thoroughly cleaned and is disposed in the suspension 14 as shown in FIG. 2. Suitable counter electrode means 18, which can also be formed of expanded-metal nickel screen, are also immersed in the suspension 14 in spaced relation to the electrode substrate 16. Preferably, two counter electrodes 18 are positioned at respective opposite sides of the electrode substrate 16 as shown in FIG. 2.

The electrode substrate 16 and the counter electrodes 18 are then connected as cathode and anode respectively to the respective terminals 20 and 22 of a suitable power supply as illustrated in FIG. 2 for establishing an electrical field within the suspension 14 between the substrate 16 and the counter electrodes 18. Preferably agitation of the suspension is continued by magnetic stirring or the like while the electrical field is maintained in the suspension. In this arrangement, it is found that the cadmium oxide particles move within the suspension under the influence of the electrical field and in the conjunction with agitation of the suspension and are rapidly deposited or plated onto the electrode substrate structure. At substantially the same time, the cadmium oxide particles are cathodically converted to electrochemically active cadmium material to form the desired porous, battery electrode structure. Although the precise mechanism of this plating action is not fully understood, it is believed that the primary mechanism involves the collision of the suspended oxide particles with the conductive substrate 16 and that charge transfer and plating of the particles on the substrate occurs during these collisions. The noted electrical field can be modified with respect to intensity and duration in any conventional manner for determining the amount of electrochemically active material which is deposited and formed on the electrode substrate to produce a battery electrode with the desired charge capacity. After rinsing and drying the electrode to remove all electrolyte from the surfaces of the electrode, the electrode is preferably pressed or compacted between pressing rolls or in other conventional manner to determine the precise thickness of the electrode structure. The electrode is then ready for use.

The electrolyte used in the process of this invention serves not only as a medium for suspending the metal oxide powder but also as a current conducting medium for establishing an electrical field between the electrode substrate 16 and the counter electrodes. The use of counter electrodes disposed at opposite sides of the electrode substrate assures uniform deposition of electrochemically active material upon all surfaces of the electrode substrate. The electrode substrate 16 serves not only as a current collecting member in the resulting electrode structure, but also serves as a means for collecting and converting the oxide powder to the desired electrochemically active material. The deposition of the oxide powder on the substrate and the conversion of the powder to the desired active electrode material are carried out in the same process step and permit production of the desired porous electrode structure within a relatively short period of time. The battery electrode produced by the process of this invention is found to have a fine, uniform layer of electrochemically active cadmium particles deposited thereon in electrically conductive relation to the substrate 16. Further, the resulting electrode structure is characterized by a high degree of porosity which exposes a large surface area of the active material to electrolytic action when the electrode is subsequently incorporated in a battery cell.

It should be understood that the electrode substrate 16 can be formed of any porous, electrically conductive material within the scope of this invention. For example, the substrate can comprise an expanded metal nickel screen as noted above or can be formed of any other conductive woven wire or expanded metal material. The substrate can also be formed of a metal felt such as nickel felt or the like embodying short metallic fibers sintered together to form a mat-like structure. The substrate 16 can also comprise a woven metal screen having conductive metal particles sintered thereto as is conventional in electrode substrates presently used in the art. Cleaning of the substrate 16 prior to immersion in the suspension 14 can be performed in any conventional manner within the scope of this invention. That is, the electrode substrate can be washed, brushed with fiber brushes, passed through a suitable solvent for degreasing the substrate, or can be treated in any other manner for removing gross contaminants from the substrate surfaces. For most purposes, it is found that passing the electrode substrate through a conventional degreasing bath provides an adequately cleaned substrate for the purposes of this invention.

EXAMPLE A

In one embodiment of the method of this invention a No. 4/0 expanded-metal nickel screen 4 square inches in area and 0.006 inch thick is used as the electrode substrate 16. A nickel strip is welded to the screen to serve as a current lead. This electrode substrate is then degreased and dried in any conventional manner. Fifty grams of reagent grade cadmium oxide powder of a particle size smaller than about 5 microns is combined with approximately 500 cc. of a 30% aqueous solution of potassium hydroxide and is thoroughly agitated and mixed by magnetic stirring means for approximately one hour. The cleaned nickel screen which is to serve as the electrode substrate is then immersed in the cadmium oxide-electrolyte suspension. Two counter electrodes, also made of expanded-metal nickel screen are also immersed in the suspension, one on either side of the electrode substrate. The electrode substrate is then connected to the negative terminal of a direct current power supply whereas the two counter electrodes are connected in parallel to the positive terminal of the power supply. A current of 1.5 amperes is passed through the suspension between the counter electrodes and substrate for approximately one hour. The current is then reduced to 500 milliamperes for an additional 16 hours. The electrode substrate is then rinsed several times in deionized water, is dried to constant weight, and is passed between pressing rollers to control the thickness of the now plated electrode substrate. After weighing, it is found that the electrode substrate has been plated with 3.336 grams of active cadmium material in a porous structure and that the plated substrate now comprises a cadmium battery electrode. The electrochemically active cadmium material plated onto the electrode substrate corresponds to about 1.42 ampere hours theoretical charge capacity assuming all of the active cadmium material comprises cadmium oxide. Further, when the electrode is subsequently charged and discharged in an open cell using nickel hydroxide as a counter electrode and using a mercury/mercuric oxide reference electrode, charging being carried out at a 610 milliamperes rate until hydrogen gas evolution is observed, the electrode is found to deliver 0.966 ampere-hour charge or approximately 68% of the theoretical charge capacity of the electrode. This corresponds to a theoretical charge density of 0.354 ampere-hour per square inch of electrode structure and observed charge capacity of 0.242 ampere-hour per square inch.

EXAMPLE B

In another embodiment of this invention, nickel felt embodying nickel fibers sintered together to form a mat-like structure approximately 4 square inches in area and 0.005 inch thick is employed as the substrate. This nickel felt is immersed in, and is vacuum impregnated with, the suspension described above with reference to Example A together with two counter electrodes as described in Example A. With the nickel felt and the counter electrodes electrically connected as cathode and anode means respectively, the nickel felt is plated within the suspension at 250 milliamperes for 16 hours. The plated substrate, now comprising a battery electrode, is washed in deionized water until the pH of the rinse water is reduced to 7. The charge capacity of the electrode is then determined by drying the electrode in an air oven at 400° F. for several hours to convert all of the electrochemically active cadmium material on the electrode to cadmium oxide. The observed weight gain is found to be 1,540 grams corresponding to 0.638 ampere-hour charge capacity and to 0.159 ampere-hour per square inch charge density.

EXAMPLE C

In another embodiment of the method of this invention, a porous, sintered nickel plaque 3.1 square inches in area and 0.025 inch thick having approximately 80% porosity is employed as the electrode substrate. This plaque is immersed in, and is vacuumed, impregnated with, the suspension previously described with reference to Example A. Counter electrodes as described in Example A were then also immersed in the suspension and, with the plaque and counter electrodes electrically connected as cathode and anode means respectively, the plaque was plated in the suspension for two hours at a rate of 500 milliamperes to form a porous electrode structure. This electrode was found to have a charge capacity 0.344 ampere-hour and a charge density of 0.112 ampere-hour per square inch.

A sealed, rechargeable nickel-camium cell was made in a conventional manner using 12 negative cadmium electrodes made in the manner described above in Example A. The cell also incorporated 9 sintered, conventionally impregnated and formed positive plates and appropriate polyamide separator means. The cell employed a 30% aqueous solution of potassium hydroxide as an electrolyte. The charge capacity of the positive electrodes was approximately 3.5 ampere-hours and the theoretical charge capacity of the negative electrodes produced according to the method of this invention was approximately 5 ampere-hours. This cell was charged at a very fast charge rate of approximately 1.5 amperes and was discharged at a fast rate of approximately 2.5 amperes and displayed very satisfactory charge and discharge cycling characteristics. In fact, during prolonged overcharge at 1.5 amperes for 3 hours, the cell developed only 2 pounds per square inch oxygen pressure indicating excellent oxygen recombination characteristics for the negative electrodes produced by the method of this invention.

It should be understood that although the method of this invention has been primarily described with reference to the forming of cadmium electrodes, other electrodes can also be formed in accordance with the method of this invention. For example, zinc oxide, silver oxide, lead oxide, manganese dioxide, or other commercially available metal oxide powers which are cathodically convertible to electrochemically active materials can be substituted for the cadmium oxide particulate in the suspension 14 previously described for making zinc, silver, lead, manganese, or other conventional porous electrode structures according to the method of this invention.

Figure 3:
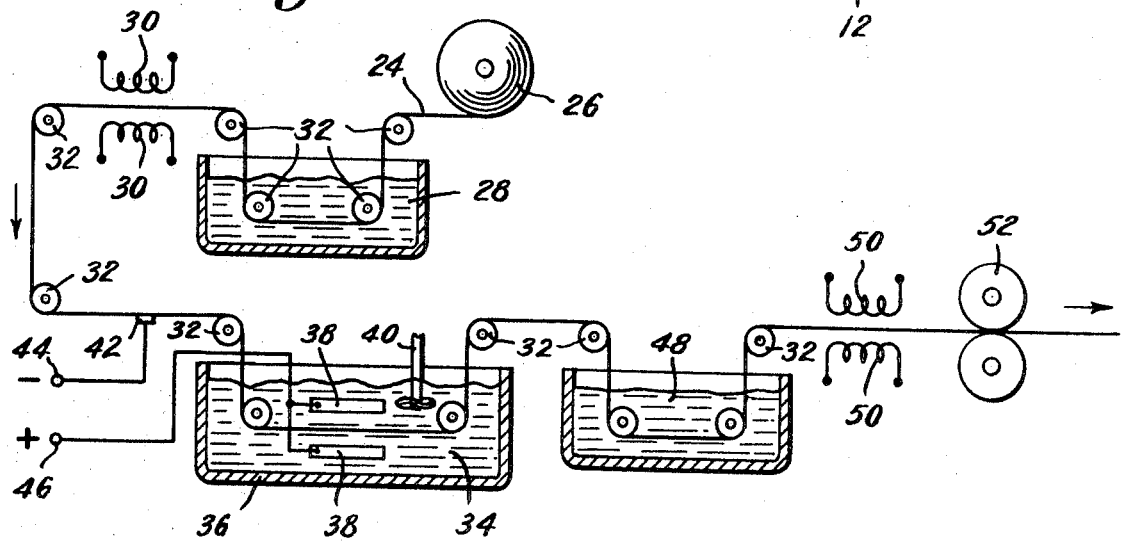
FIG. 3 is a diagrammatic view illustrating process steps of another embodiment of this invention.

In a very practical embodiment, the method of this invention is adapted for the continuous production of battery electrodes. That is, as illustrated in FIG. 3, a length of expanded metal nickel screen 24 is continuously advanced from a pay-out reel 26 through a conventional degreasing bath 28 after which the screen is advanced between heater means 30 for fully drying the screen. The screen, supported throughout its advancement by guide rolls 32, is then advanced through a suspension 34 embodying a finely-divided cadmium oxide particulate in an electrolyte such as an aqueous solution of potassium hydroxide. The suspension 34 is contained within a tank 36 and a pair of counter electrode means 38 are supported within the suspension in any conventional manner. Guide rolls 32 support the screen 24 in its passage through the suspension 34 in equally spaced relation to the counter electrode means 38. In addition, the suspension 34 is agitated continuously as the screen 24 is advanced through the suspension as is diagrammatically indicated at 40 in FIG. 3. In this embodiment of this invention conventional brush means 42 slidably engage the advancing screen 24 and electrically connect the screen to the negative terminal of a direct current power supply indicated at 44 in FIG. 3. In addition, the counter electrode means 38 are electrically connected in parallel to the positive terminal 46 of the power supply.

In this arrangement, the cadmium oxide particles in the suspension 34 are subjected to an electrical field established between the screen 24 and the counter electrode means 38 at respective opposite sides of the screen 24. Under the influence of this electrical field, in conjunction with agitation of the suspension by the mixing means 40, the cadmium oxide particles in the suspension 34 move towards and are deposited or plated upon the screen 24 as the screen advances through the suspension. As the cadmium oxide particles are deposited on the screen, the particles are cathodically converted to electrochemically active cadmium material to form a finely-pored coating of active material of uniform thickness upon the screen, thereby forming the desired porous battery electrode structure. As will be understood, the intensity of the electrical field established within the suspension 34 can be regulated by controlling the current furnished by the power source. In this way the rate of plating and converting active cadmium material upon the screen 24 is readily controlled. In addition, the length of the path along which the screen 24 is advanced through the suspension 34 and the rates of screen advancement are easily adjusted in any conventional manner for adjusting the period during which plating of the screen occurs. By these means, the amount of active cadmium material formed upon the screen is readily determined. After plating of the screen to form a battery electrode structure, the structure is preferably advanced through a rinsing bath 48 of deionized water, the path of advancement of the electrode structure being sufficient to remove substantially all electrolyte from the electrode structure. The electrode structure is then dried, preferably by being advanced between heating means diagrammatically illustrated at 50 in FIG. 3, for assuring complete removal of the electrolyte. Preferably the electrode structure is then advanced between pressing rolls 52 of any conventional type where the electrode structure is slightly compacted and where any undesirable projections from the electrode structure are removed for precisely determining the thickness of the electrode structure. As will be understood, the electrode structure can then be cut by punch press means or the like into any selected shape for forming individual battery electrodes. In addition, if desired, electrode leads (not shown) can be welded or otherwise secured in electrically conductive relation to the individual electrodes.

It can be seen that the method of this invention is particularly well adapted for the continuous production of battery electrodes and that the time required for producing such electrodes is substantially less than has been required in prior art electrode manufacturing processes. That is, whereas prior art processes have required repeated impregnation of a porous electrode substrate and conversion of the material with which the substrate is impregnated followed by cathodic conversion of the impregnated to produce an electrochemically active material, the method of this invention substantially simultaneously deposits a metal oxide powder onto a substrate material and cathodically converts the powder to an electrochemically active material. In addition, where prior art electrode forming processes have required use of the relatively expensive sintered electrode substrate, the method of this invention can employ much less expensive woven wire or expanded metal nickel screen and the like.

It should be understood that a number of variations and modifications of the process of this invention will be apparent to those skilled in the art. For example, binder material such as solutions or suspensions of polyethylene powder can be added to the suspension above described for improving bonding of active electrode material to the electrode substrate. In addition, periodic polarity reversal of the cathode and anode means used in plating according to this invention can assure more uniform plating of the electrode structure. Although particular embodiments of the invention have been described by way of illustration, this invention includes all modifications and equivalents thereof which fall within the scope of the appended claims.

We claim:

1. A method for making a battery electrode comprising forming an electrical circuit between porous, electrically conductive electrode substrate means and counter electrode means through a suspension of a metal-oxide powder in an aqueous alkaline electrolyte for depositing said powder as an electrochemically active material on said substrate means to form a battery electrode.

2. A method for making a battery electrode comprising the steps of disposing porous, electrically conductive electrode substrate means and counter electrode means in a suspension embodying metal oxide powders cathodically convertible to an electrochemically active material and an aqueous alkaline electrolytic suspension means, and establishing an electrical field between said substrate and counter electrode means through said suspension for depositing said metal oxide powder on said substrate means and converting said metal oxide powder to an electrochemically active material to form a battery electrode.

3. A method for making a battery electrode comprising the steps of immersing a clean, porous, electrically conductive electrode substrate and counter electrode means in a bath embodying a metal oxide particulate suspended in an aqueous alkaline electrolyte, and electrically connecting said substrate and counter electrode means as cathode and anode means respectively for depositing said metal oxide powder on said substrate and converting said metal oxide powder to an electrochemically active material to form a porous battery electrode.

4. A method as set forth in claim 3 wherein the particles of said metal oxide particulate are the size less than about 2 microns.

5. A method as set forth in claim 3 wherein said suspension is agitated while said substrate and counter electrode means are connected as said cathode and anode means for facilitating deposition of said metal oxide powder on said substrate.

6. A method as set forth in claim 5 wherein the particles of said metal oxide particulate are the size of less than about 5 microns.

7. A method for making a battery electrode comprising the steps of mixing a metal oxide particulate in an aqueous alkaline electrolyte to form a suspension, immersing a porous, electrically conductive electrode substrate and counter electrodes in spaced relation to each other in said suspension agitating said suspension, electrically connecting said substrate and counter electrode as cathode and anode means respectively, for depositing said metal oxide particulate on said substrate and converting said metal oxide particulate to an electrochemically active material to form a porous battery electrode structure, rinsing said structure, and pressing said structure to form a battery electrode of selected thickness.

8. A method for making a cadmium battery electrode comprising the steps of mixing a cadmium oxide particulate in an aqueous alkaline electrolyte to form a suspension, immersing porous electrically conductive electrode substrate means and counter electrode means in spaced relation to each other in said suspension, electrically connecting said substrate and counter electrode means as cathode and anode means respectively for depositing said cadmium oxide particulate on said substrate means and converting said cadmium oxide particulate to electrochemically active cadmium material to form a porous battery electrode structure, rinsing said battery electrode structure, and pressing said structure to form a cadmium battery electrode of selected thickness.

9. A method as set forth in claim 8 wherein said electrolyte comprises an aqueous solution of potassium hydroxide.

10. A method as set forth in claim 8 wherein said electrode substrate comprises a porus nickel screen.

11. A method for continually producing battery electrode structure comprising the steps of continuously advancing a length of porous electrically conductive electrode substrate material through a suspension embodying a metal oxide powder in an aqueous alkaline electrolytic suspending medium, disposing counter electrode means in said suspension, and electrically connecting said substrate and counter electrode means as cathode and anode respectively for depositing said metal oxide on said substrate material and converting said metal oxide to electrochemically active material while said substrate material is advanced through said suspension.

12. A method as set forth in claim 11 wherein said electrode structure is continuously advanced through a rinsing bath for removing said electrolyte suspending medium.

References Cited
UNITED STATES PATENTS

| | | | |
|---|---|---|---|
| 3,459,651 | 8/1969 | Weininger et al. | 204—181 |
| 2,737,541 | 3/1956 | Coolidge | 204—181 |
| 3,377,202 | 4/1968 | Belove | 204—28 |

HOWARD S. WILLIAMS, Primary Examiner